(No Model.)

S. E. CODDING.
Underground Conduits for Telegraph Conductors.

No. 231,537. Patented Aug. 24, 1880.

WITNESSES:
Francis McArdle.
C. Sedgwick

INVENTOR:
S. E. Codding
BY Munn & Co
ATTORNEYS.

UNITED STATES PATENT OFFICE.

SETH E. CODDING, OF NEW BEDFORD, MASSACHUSETTS.

UNDERGROUND CONDUIT FOR TELEGRAPH-CONDUCTORS.

SPECIFICATION forming part of Letters Patent No. 231,537, dated August 24, 1880.

Application filed May 1, 1880. (No model.)

*To all whom it may concern:*

Be it known that I, SETH E. CODDING, of New Bedford, in the county of Bristol and State of Massachusetts, have invented a new and useful Improvement in Underground Conduits for Telegraph-Wires, &c., of which the following is a specification.

My invention relates to the laying of underground conduits for telegraph wires and cables. I manufacture such conduits in a box or trench with concrete or cement around a mandrel or core, the mandrel being moved along progressively as the work proceeds.

By this method the work may be done rapidly and cheaply, and a durable conduit or pipe produced.

In the case of a conduit for wires the concrete may be laid so as to have numerous parallel passages.

The method of laying the pipe will be described more particularly with reference to the accompanying drawings, forming part of this specification, wherein—

Figure 1:
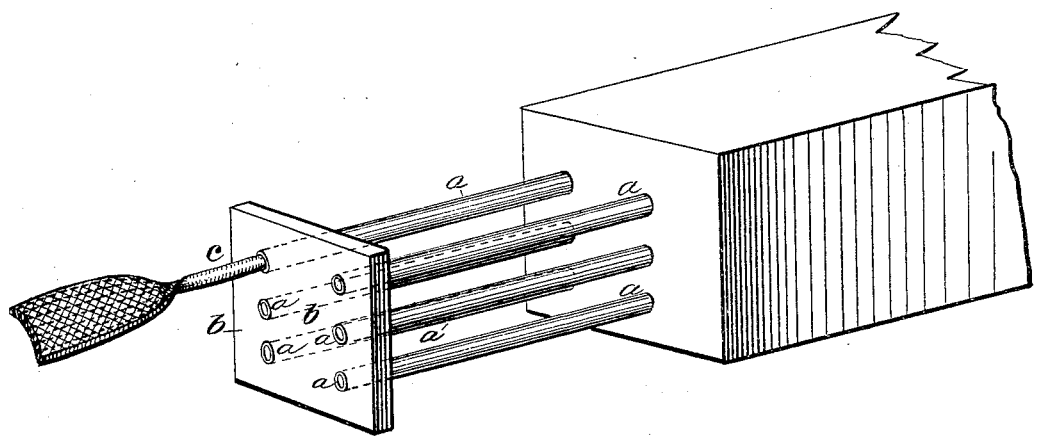
Figure 2:
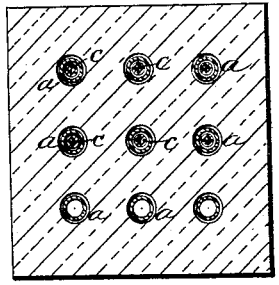

Figure 1 is a perspective view, showing a section of completed pipe and the movable mandrel. Fig. 2 is a cross-section of the pipe.

Similar letters of reference indicate corresponding parts.

For laying telegraph-wires underground I coat them first with paraffine or similar material, and then braid or weave around a number of the wires asbestus, cotton, flax, or other fibrous material to form a flat ribbon. Such ribbon may contain, say, twenty or more wires, and it is to be rolled lengthwise and covered with some cheap material to prevent abrasion. Upon this coil a short section of metal tubing is to be placed, or, if a number of coils are to be laid at once, each one will be fitted with a section of tubing, such tubing being large enough to slide freely. These tubes are the cores or mandrels, and are shown at *a* in the drawings, and, for convenience, they are fitted at their outer ends in a head, *b*, for retaining them parallel. *c* is the coil of incased wires.

The trench is first prepared, and, if desired, fitted with a wooden box. The mandrels or cores with the wires are then to be laid in the trench or box and the cement or concrete packed around the cores *a*. As soon as the cement sets, the cores are to be drawn out over the coils of wire and the cement laid as before, and so on.

By this method the wires will be incased in a durable conduit, and the passage made by the cores being larger than the coils of wire, the air has access to dry the cement, and the wires may be drawn out when that is required.

The conduit will connect at suitable intervals with vaults that give access to the wire.

For a bend in the conduit a cement pipe of desired shape, molded in any suitable manner, may be used.

The core or mandrel should have a smooth or polished surface, and it may be solid instead of tubular.

Having thus fully described my invention, I claim as new and desire to secure by Letters Patent—

The method of laying underground-telegraph wire and forming conduits therefor progressively, which consists in laying cement or concrete in a trench around a tubular core or mandrel containing the wires and sliding the core forward upon the wire as the conduit is completed, as specified.

SETH EVERETT CODDING.

Witnesses:
 FREDK. C. S. BARTLETT,
 EDWIN A. DOUGLASS.